(12) United States Patent
Gonzalez

(10) Patent No.: US 7,698,532 B1
(45) Date of Patent: Apr. 13, 2010

(54) METHOD AND APPARATUS FOR TAPE LIBRARY EMULATION

(75) Inventor: Cesar A. Gonzalez, Oviedo, FL (US)

(73) Assignee: Symantec Operating Corporation, Cupertino, CA (US)

( * ) Notice: Subject to any disclaimer, the term of this patent is extended or adjusted under 35 U.S.C. 154(b) by 238 days.

(21) Appl. No.: 10/606,604

(22) Filed: Jun. 26, 2003

(51) Int. Cl.
  *G06F 12/10* (2006.01)
  *G06F 13/00* (2006.01)
(52) U.S. Cl. .................................... 711/202; 711/162
(58) Field of Classification Search ................... None
  See application file for complete search history.

(56) References Cited

U.S. PATENT DOCUMENTS

| | | | |
|---|---|---|---|
| 6,529,996 B1 | 3/2003 | Nguyen et al. .............. 711/114 |
| 6,816,957 B1 | 11/2004 | Halladay et al. ............ 711/170 |
| 7,069,466 B2* | 6/2006 | Trimmer et al. ................ 714/6 |
| 2004/0034811 A1* | 2/2004 | Trimmer et al. ............... 714/13 |
| 2004/0078639 A1* | 4/2004 | Anna et al. ..................... 714/6 |
| 2004/0111251 A1* | 6/2004 | Trimmer et al. ............... 703/26 |
| 2004/0153614 A1* | 8/2004 | Bitner et al. ................. 711/162 |
| 2004/0153739 A1* | 8/2004 | Trimmer et al. ................ 714/7 |

\* cited by examiner

*Primary Examiner*—Tuan V Thai
*Assistant Examiner*—Duc T Doan
(74) *Attorney, Agent, or Firm*—Campbell Stephenson LLP

(57) ABSTRACT

A method is disclosed that includes converting a first command to a second command. The first command is configured to control a first type of storage unit, while the second command is configured to control a second type of storage unit. The first type of storage unit is a secondary storage unit. The second type of storage unit is a primary storage unit.

23 Claims, 6 Drawing Sheets

METHOD AND APPARATUS FOR TAPE LIBRARY EMULATION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

CROSS REFERENCE TO ATTACHED APPENDIX

Appendix A contains the following files in one CD-ROM (of which two identical copies accompany the present patent application), and is part of the present disclosure and is incorporated by reference in its entirety:

| | | | |
|---|---|---|---|
| Jun. 20, 2003 | 01:55p | 3,066 | Virtual Loader Library.txt |
| Jun. 20, 2003 | 01:56p | 896 | Main Module.txt |
| Jun. 20, 2003 | 01:55p | 4,803 | Disk Access Library.txt |
| Jun. 20, 2003 | 01:57p | 5,665 | Virtual Loader Utilities.txt |
| Jun. 25, 2003 | 03:30p | 449 | directory1.txt |

The files of Appendix A form source code of computer programs and related data of an illustrative embodiment of the present invention. More specifically, the files provide pseudocode for an implementation of a system providing the functionalities discussed herein.

BACKGROUND OF THE INVENTION

1. Field of the Invention

This invention relates to the field of data storage devices, and more particularly relates to a method and apparatus for emulating a tape backup unit.

2. Description of the Related Art

Advances in applications programs, networking technology, bus architectures, processor technology, hard disk storage capacities and other aspects of today's computing systems have been fueled by business' insatiable need for the information provided by such computing systems. Until fairly recently, storage has been only a small part of the computing infrastructure supporting these advanced computing systems. As data, and the content represented by that data have become increasingly valuable to businesses, however, information storage has emerged as one of the most important aspects of today's data centers. In fact, today's business environment has experienced an explosive growth in data storage requirements, particularly in the primary storage industry (e.g., hard drives and hard-drive-based subsystems). Generally, primary storage typically employs storage technology that is suited for workloads requiring constant, high-volume access to data, such as intensive database activity and frequently-accessed user data. This is in contrast to secondary storage, which is typically used for applications in which infrequent, serial access is required, such as backup for archival storage.

Storage infrastructures have thus undergone considerable changes and advances to keep pace with the rest of the computing equipment now in use. One often overlooked aspect of the storage boom is the effect that this explosion has had on the market for secondary storage (removable media storage), such as tape backup technology.

As storage requirements have changed, tape subsystem technologies have evolved as well, keeping pace with the changes in storage infrastructure technology as a whole. This evolution presents particularly interesting challenges with regard to tape backup technology, because protecting the data stored in today's rapidly-growing storage subsystems is an absolute requirement. Although tape has been around for almost half a century, it remains one of the most cost-effective methods for storing and retrieving data. Tape backup offers the capacity, reliability, and speed necessary for storing and protecting the ever-increasing amount of data generated by businesses. This fact has created an ever growing need for larger and higher-performance tape drives, tape libraries and automation subsystems.

However, tape drives and tape libraries (potentially large, multi-slot (tape) mechanisms in which robotic arms swap tapes in and out of one or more tape drives in the library) are not without their limitations. For developers, the purchase and maintenance of tape drives, and tape libraries in particular, can be expensive and cumbersome. Tape drives and, particularly, tape libraries are slow in comparison to primary storage, potentially limiting the frequency with which such devices can be called into service (for backup, archiving or other purposes). For multi-library installations, slots must be transferred between libraries manually, an obviously labor-intensive operation. In situations where a tape drive or tape library is heavily used, reliability can become an issue, due to the physical mechanisms involved.

What is thus needed is a method and system that address the foregoing limitations. In particular, such a method and system should address the physical limitations of such systems (e.g., speed, reliability, size and the like).

SUMMARY OF THE INVENTION

The needs outlined above are addressed by a method and system of the present invention. By providing an emulation of secondary storage functionality (e.g., tape drive/tape library functionality) using one or more primary storage devices, a virtual secondary storage device according to the present invention meets the need for fast, reliable data transfers, without the cost and physical limitations typically associated with secondary storage systems. Moreover, when paired with a physical secondary storage device, a method and system of the present invention allows for frequent backup to the virtual secondary storage device, with periodic backup from the virtual device to the physical device. This avoids the problems associated with frequent backup to a physical device, while providing the advantages of secondary storage (e.g., media that is inexpensive, high-capacity and removable).

The functionality associated with a method and system of the present invention is provided via the creation, management and use of a virtual secondary storage unit. Such functionality is provided by a virtual device interface, which performs several functions. The virtual device interface supports the creation and use of one or more virtual devices on one or more primary storage devices. The virtual device interface also allows an application to issue standard commands (as would be issued to a virtual device's physical counterpart) to the virtual device. The virtual device interface also supports the management of virtual devices, either in the manner of physical devices, or in a virtual device "aware" manner. Additionally, rather than maintaining control information on the media (as would be the case for a physical device), the virtual device interface can maintain the information internally.

In one embodiment, a method according to the present invention is disclosed. The method includes converting a first command to a second command. The first command is configured to control a first type of storage unit, while the second command is configured to control a second type of storage unit. The first type of storage unit is a secondary storage unit. The second type of storage unit is a primary storage unit.

In another embodiment, a system according to the present invention is disclosed. The system includes a virtual device interface. The virtual device interface is configured to allow a primary storage unit to be accessed as a secondary storage unit.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
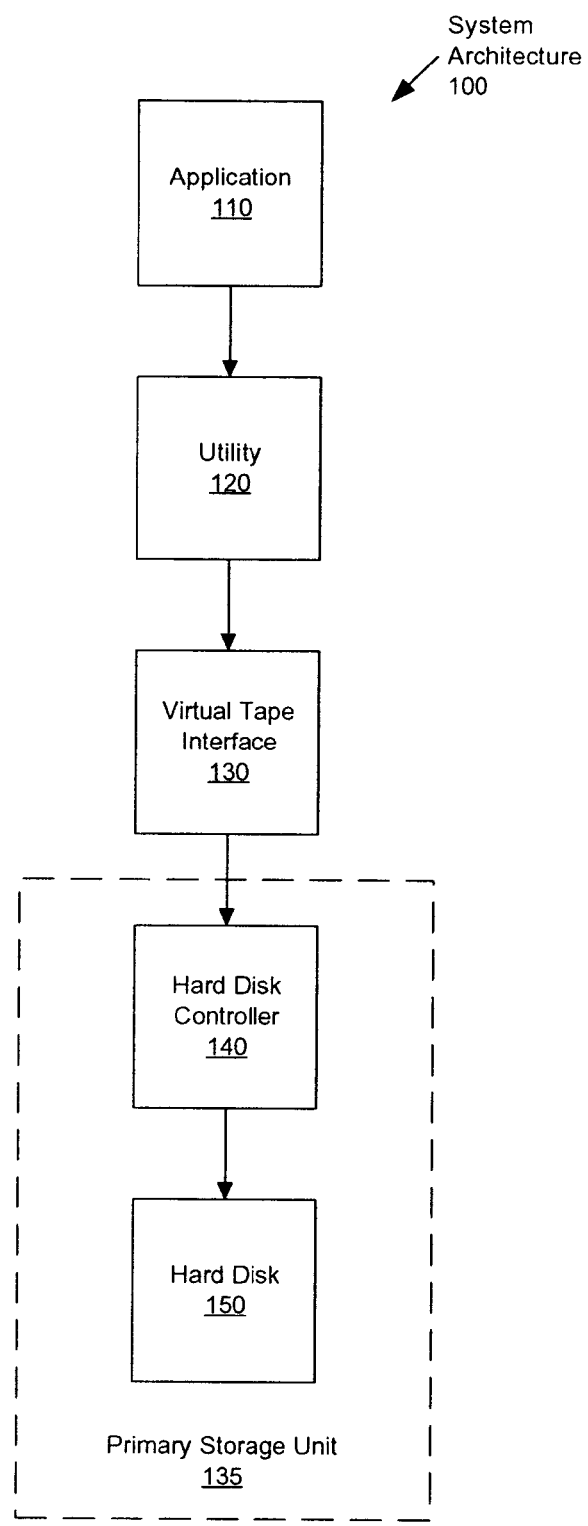
FIG. 1 is a block diagram illustrating the elements of a virtual tape library according to embodiments of the present invention.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The invention provides a method and apparatus that allows users to backup and restore data using a primary storage device in a manner associated with a secondary storage device. For example, non-removable storage media such as a hard drive can be accessed in a manner associated with removable storage media such as a physical tape library. Thus, as with a physical tape library, a tape library emulation according to the present invention allows a user to insert a new tape into the tape library, remove a tape from the tape library, load a tape in the tape library into the tape library's tape drive, unload a tape from the tape library's tape drive, and perform other operations associated with a physical tape library. As will be apparent, the emulation of a physical tape library necessarily includes the emulation of the tape library's tape drive, and support for the commands associated therewith.

More particularly, a virtual tape interface that supports the emulation of multiple virtual libraries is described herein. Using a user interface (UI) such as a graphical user interface (GUI), an administrator creates backup folder objects, selecting the destination path and, optionally, tape capacity and family names. This creates a unique one-to-one correspondence between the folders and the virtual loaders (virtual tape libraries). In one embodiment, up to ten such folder objects (virtual loaders) can be created, allowing users to perform up to ten simultaneous backup\restore operations. It should be noted that, while new objects can be created at any time, the application accessing the virtual loader(s) will typically need to be reinitialized, in order to recognize the new device(s).

The application programming interface (API) for a virtual loader according to the present invention can provide, for example, the following functionality:

1. CreateVirtualLoader: This function provides a path to storage volume. Optionally, the number of slots, tape capacity and tape names can be specified; otherwise, default values are used. If the directory specified already exists, that directory will be used, including its existing contents.

2. CreateVirtualTape: This function allows the creation of a new tape, to be used in a subsequent backup operation.

3. DeleteVirtualTape: This function allows a previously created tape to be deleted, allowing disk space to be recovered.

4. MoveVirtualTapes: This function allows tapes to be imported into an existing folder.

5. GetVirtualLoaderInformation: This function allows the application to retrieve known information for the current virtual loader from the device driver. This call returns a new drive type that indicates a virtual device.

6. DeleteVirtualLoader: References to the virtual loader are deleted from the virtual loader configuration file. However, the virtual loader's physical directory and contents need not be deleted, allowing volumes that are full to be dismounted, put away and then later recreated.

7. InventoryVirtualLoader: This function allows virtual tapes, recently moved into an existing virtual loader, to be recognized.

Also, the user should be prevented (or at least alerted) to the situation in which the available storage capacity of the non-removable storage device (e.g., hard drive) has, or will soon be, completely consumed. For example, the user can be alerted when the space left in the hard drive is less than 6% of its original size, but the application can be allowed to finish the current backup operation, up to the point where the space left in the drive is less than 5% of its original size.

While these functions are described below in greater detailed, it should be noted that pseudocode for such functions can be found in Appendix A, the CD-ROM appendix accompanying this application, as previously included by reference herein.

An Example Software Architecture for Tape Library Emulation

FIG. 1 is a block diagram illustrating an architecture according to the present invention, depicted in FIG. 1 as a system architecture 100. As will be apparent to one of skill in the art, system architecture 100 includes both hardware and software components. In system architecture 100, an application 110 interfaces with a utility 120, both of which are typically software components. Application 110 can be, for example, any application program that is supported by utility 120. In turn, utility 120 is a system utility that, for example, allows a user of application 110 to perform certain of the more pedestrian chores of maintaining a computer system (e.g., backing up user data for security and disaster recovery purposes). Virtual tape interface 130, also typically a software component, provides utility 120 (and so application 110) with access to a primary storage unit 135. Primary storage unit 135 includes, for example, a hard disk controller 140 and a hard disk 150, and is thus primarily hardware components. More generally, primary storage unit 135 can be any type of primary storage device supported by system architecture 100. Virtual tape interface 130 is thus capable of accessing hard disk 150 via hard disk controller 140.

In system architecture 100, utility 120 interfaces with a virtual tape interface 130. As is well known in the art, user data, application programs and other such information may be backed-up to tape for purposes of archiving and disaster recovery, for example. In a similar manner, virtual tape interface 130 provides the functionality of a tape library, providing access to hard disk 150 via a hard disk controller 140 in a manner that one would typically associate with a tape library. Virtual tape interface 130 thus allows hard disk 150 to appear as a tape library to utility 120 and application 110.

Figure 2:
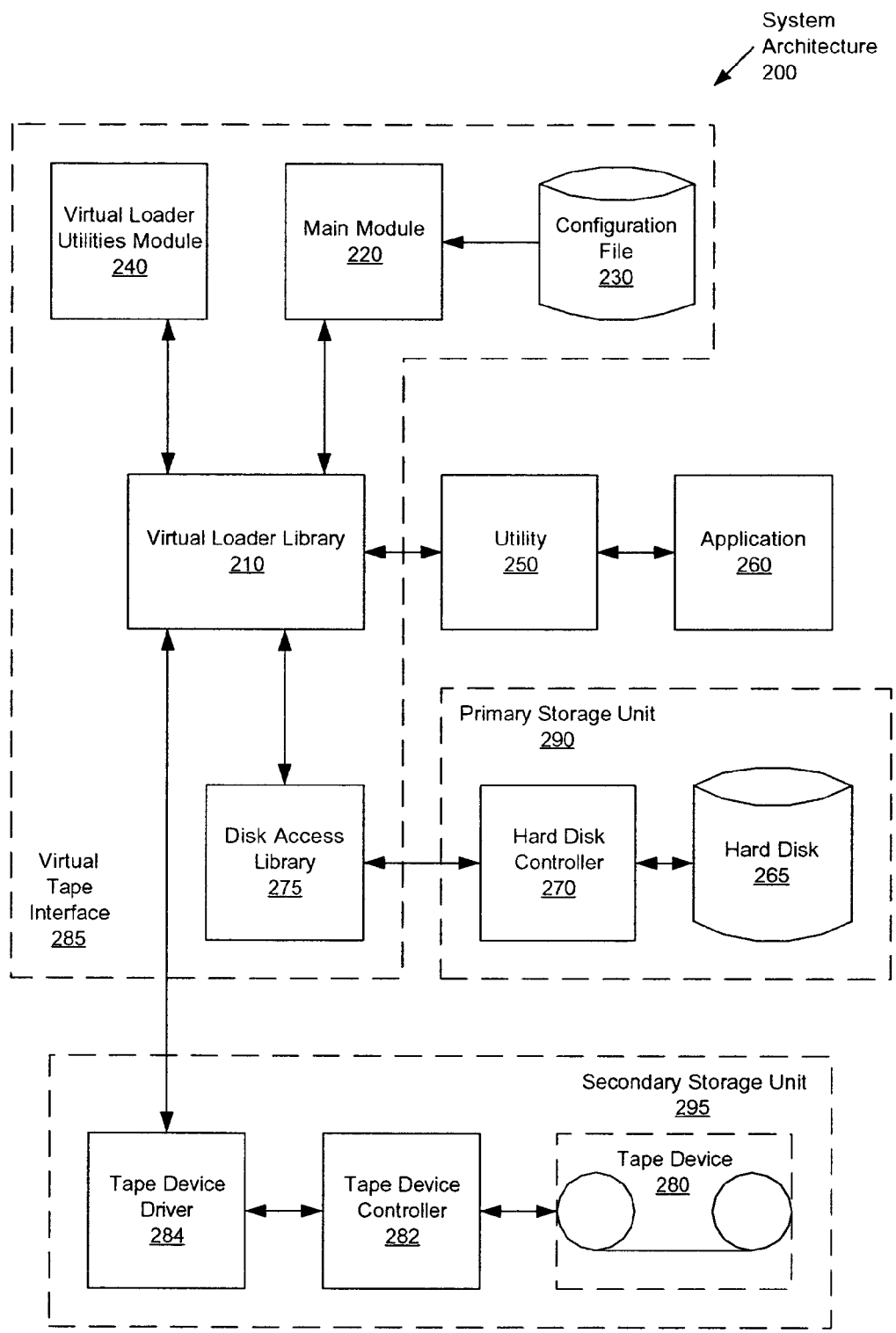
FIG. 2 is a block diagram illustrating the elements of a virtual tape library according to embodiments of the present invention such as is depicted in FIG. 1, in greater detail.

FIG. 2 is a block diagram illustrating a system architecture 200, which is a more specific and detailed depiction of system architecture 100. The centerpiece of system architecture 200 is a virtual loader library 210, which is called by a main module 220. Main module 220 initiates the processes that perform the emulation of a tape library, and configures one or more virtual loader in accordance with information stored in a configuration file 230 (as well as those provided via a command line interface (CLI)). Supporting virtual loader library 210 is a set of utilities depicted in FIG. 2 as virtual loader utilities module 240.

It will be noted that virtual loader library 210 corresponds to virtual tape interface 130 from the perspective of a calling utility (e.g., a utility 250) and so the application employing the utility (e.g., an application 260). Virtual loader library 210 provides access to a hard disk 265 via a hard disk controller 270, which is accessed by a disk access library 275.

Virtual loader library 210 also provides access to a tape device 280 via a tape device controller 282, which in turn, is accessible by virtual loader library 210 using a tape device driver 284 thus, application 260 (via utility 250) is able to access a virtual loader that is emulated using virtual loader library 210, disk access library 275, hard disk controller 270 and hard disk 265. Alternatively, virtual loader library 210 can support access to tape device 280 (via tape device controller 282) using a tape device driver 284.

It will be appreciated that, in combination, main module 220, configuration file 230, virtual loader library 210, disk access library 275 and virtual loader utilities module 240 provide the functionality of virtual tape interface 130 (and so are depicted, in the aggregate, as a virtual tape interface 285). As will also be appreciated, hard disk controller 270 and hard disk 265, in the aggregate, are an example of the technology which can be used to implement a primary storage unit 290, and which can be, in fact, any type of primary storage device supported by system architecture 200. In a similar fashion, while tape device 280, tape device controller 282 and tape device driver 284 are, in the aggregate, an example of the technology which can be used to implement a secondary storage unit 295, and which can be, in fact, any type of secondary storage device supported by system architecture 200.

The modules depicted in FIG. 2 can be implemented in the following manner. Main module 220, which accesses configuration file 230 (or, alternatively, a backup configuration file (not shown)), first determines location of the configuration file in question, and then reads any command line interface (CLI) arguments supplied by the user. Using the information supplied, main module 220 determines if the configuration file is readable. If the configuration file is readable, the configuration is read from that file. If not, a backup copy of the configuration file is read. If the backup copy of the configuration file is not readable, main module 220 indicates that an error has occurred, and exits.

Once a configuration is read, main module 220 creates one or more virtual loader(s). The virtual loader(s) are then accessed using the routines in virtual loader library 210 and virtual loader utilities module 240. Upon termination, main module 220 deallocates the resources used in emulating the tape libraries by deallocating the structures associated with the emulation. An example of a main module such as main module 220, written in pseudocode, is given in Appendix A, provided on the CD-ROM appendix accompanying this application, as previously included by reference herein.

Virtual loader library 210 provides a number of routines that allow the creation, manipulation and deletion of virtual loaders and virtual tapes. These routines can, for example, perform the following functions:

Remounting a virtual tape left on a virtual loader's tape drive

Creating a virtual loader (which creates a directory that is used to emulate a loader (with virtual tapes (files) therein))

Deleting a virtual loader

Creating a virtual tape (which creates a file that is used to emulate a tape)

Erasing a virtual tape

Generating an inventory of the current virtual loader's virtual tapes, including identifying the last slot used Obtaining information regarding a given virtual loader It should also be noted that virtual loader library 210 provides the necessary routines to access tape device controller 282 and tape device 280 (via tape device driver 284), thereby supporting the coexistence of virtual loaders and tape libraries. This is advantageous for transferring information between a virtual loader and a tape library, and is particularly advantageous in the situation where a one-to-one correspondence exists between the slots of a virtual loader and those of a tape library, as will be discussed subsequently. An example of a virtual loader library such as virtual loader library 210, written in pseudocode, is given in Appendix A, as provided on the CD-ROM appendix accompanying this application, as previously included by reference herein.

Virtual loader utilities module 240 can include, for example, functionality such as the ability to:

- Create a virtual loader by creating the virtual loader's root directory. Once that is complete, the loader channel can then be built.
- Delete a virtual loader (including deallocating its data structures and, optionally, deleting its files/directories).
- Create a slot map by creating a path for the virtual loader's name and then creating the file that will serve as the slot map file. Once created, the system can write information regarding the virtual loader's slot map to the slot map file.
- Update the slot map file, which includes identifying the slot map file and accessing the backup copy, if necessary. Actions that can be performed can include save_only, update_and_save and do_nothing (because slot is empty), which allows the system to load a virtual tape already in the virtual loader or add a virtual tape to the virtual loader.
- Create a virtual tape, which includes checking for an available slot/tape, allocating space for virtual tape's data structure, performing filesystem checks and path/file creation, setting virtual tape header information, and updating the slot map file and configuration file to reflect the new configuration.
- Delete a virtual tape.

An example of a virtual loader utilities module such as virtual loader utilities module 240, written in pseudocode, is given in Appendix A, as provided on the CD-ROM appendix accompanying this application, as previously included by reference herein.

The routines of disk access library 275 provide virtual loader library 210 access to primary storage unit 290 (e.g., hard disk 265 via hard disk controller 270), as well as to secondary storage unit 295. The functionality provided includes:

- Processing of commands intended for the virtual loader, with support for commands such as:
  - TEST_UNIT_READY
  - REWIND
  - REQUEST_SENSE
  - READ
  - WRITE
  - WRITE_FILEMARKS
  - SPACE
  - INQUIRY
  - MODE_SELECT
  - ERASE
  - LOAD_UNLOAD
  - READ_POSITION
  - LOCATE
- Processing commands intended for the physical tape library, with support for commands such as:
  - TEST_UNIT_READY
  - INQUIRY
  - MODE_SENSE
  - MOVE_MEDIUM
  - READ_ELEMENT_STATUS
  - INITIALIZE_ELEMENT_STATUS
  - POSITION_ELEMENT
  - REZERO
- As well as other "housekeeping" commands, including those directed to the hard disk and hard disk controller An example of a disk access library such as disk access library 275, written in pseudocode, is given in Appendix A, as provided on the CD-ROM appendix accompanying this application, as previously included by reference herein.

Figure 3:
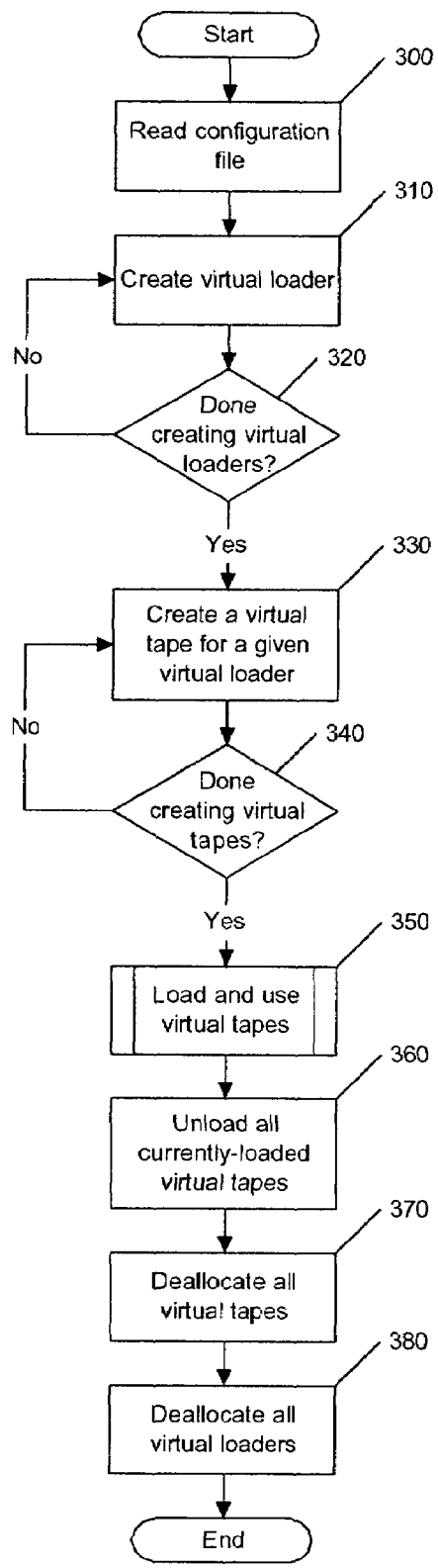
FIG. 3 is a flow diagram illustrating a process of configuring one or more virtual tape libraries according to embodiments of the present invention.

FIG. 3 is a flow diagram illustrating the actions performed by a virtual loader in emulating a tape library. The process begins with the main module reading the configuration file (step 300). The configuration file includes information regarding the number of virtual loaders to be emulated, the number of virtual tape slots in each virtual loader, virtual tape parameters, the virtual tape (if any) in the virtual tape drive and the like. Once the configuration file has been read, one or more virtual loaders are created (steps 310 and 320).

Once the desired virtual loaders have been created (or the maximum number of virtual loaders have been created), at least one virtual tape will typically be created for each virtual loader (steps 330 and 340). As will be apparent to one of skill in the art, a virtual tape need not be created immediately for a given virtual loader, while the creation of multiple virtual tapes may be desirable in other situations. Each virtual tape is created with the appropriate parameters, as indicated by the configuration file. Once the requisite number of virtual tapes have been created for each virtual loader, one of or more of these virtual tapes can then be loaded for use in a respective one of the newly-created virtual loaders (step 350).

After the user has made use of the requisite virtual tapes/loaders, and no longer requires their use, the user begins retiring the emulation. This operation begins with the unloading of all currently-loaded virtual tapes (step 360). Data structures for the current set of virtual tapes are then deallocated (step 370). Once the virtual tapes have been deallocated, the virtual loaders are deallocated (step 380). It should be noted that, typically, the files and directories representing the virtual tapes and virtual loaders will then remain intact on the hard disk, available for future use (or examination) in their then-current state.

Because a virtual loader according to the present invention is designed to emulate the operation of a physical tape library, the commands issued to and operations performed on such a virtual loader will, typically, closely follow those of a physical tape library (unless the user is given visibility into the emulation). As can be seen in the pseudocode provided as Appendix A (as provided on the CD-ROM appendix accompanying this application, as previously included by reference herein), the operations supported by the example emulation embodied therein are the same kinds of operations performed on a physical tape library. A user can thus create virtual tapes, load and record information to those virtual tapes, and subsequently unload those virtual tapes. If a new virtual tape is needed, the user simply issues a command to add a tape to the library. If a virtual tape or virtual tape library is no longer needed, the user can delete either or both. This provides a great deal of flexibility, and several advantages.

For example, in one embodiment, a user can operate a system such as system architecture 200 in the following manner. From the UI, the user selects the path for the backup folder and a call is issued to the utility, which in turn calls the virtual loader library to create a virtual loader (e.g., via a CreateVirtualLoader call). The virtual loader library creates a virtual loader (e.g., having 1000 slots and one drive), along with a single tape to be used by the first backup targeted to the virtual loader (backup folder). Next, the utility is reinitialized so the application can recognize the new device. Additionally, the utility also gives the user the chance to create a virtual loader the first time the utility is initialized, if no other physical devices are detected.

Once the application is initialized, the new device is detected and reported as a virtual object, which tells the UI to handle this device differently from normal devices; no drive or loader arm is displayed and only the corresponding backup folder is shown on the UI. After backup operations are targeted to this folder, the program flow proceeds as usual with the exception of End Of Media (EOM) handling. When EOM is reached on a virtual device, a virtual device is able to automatically create a new tape to be used for continuation of the backup operation. This added convenience is made possible by the present invention's virtual implementation. When the end of physical disk space is approaching, the driver will return a different error code to the application, so that the appropriate actions can be taken. Optionally, rather than store file marks on the virtual tape (i.e., in the file that emulates the virtual tape), the file marks can be treated as virtual file marks, and maintained by the software in memory. Of course, since the underlying device can be accessed as a character- or block-oriented device, the emulation can take advantage of this fact to provide the improved performance provided by block access, including variable block mode reads and writes. However, aside from these slight differences, other operations typically supported by the typical physical device will be supported by a virtual approach according to the present invention.

Figure 4:
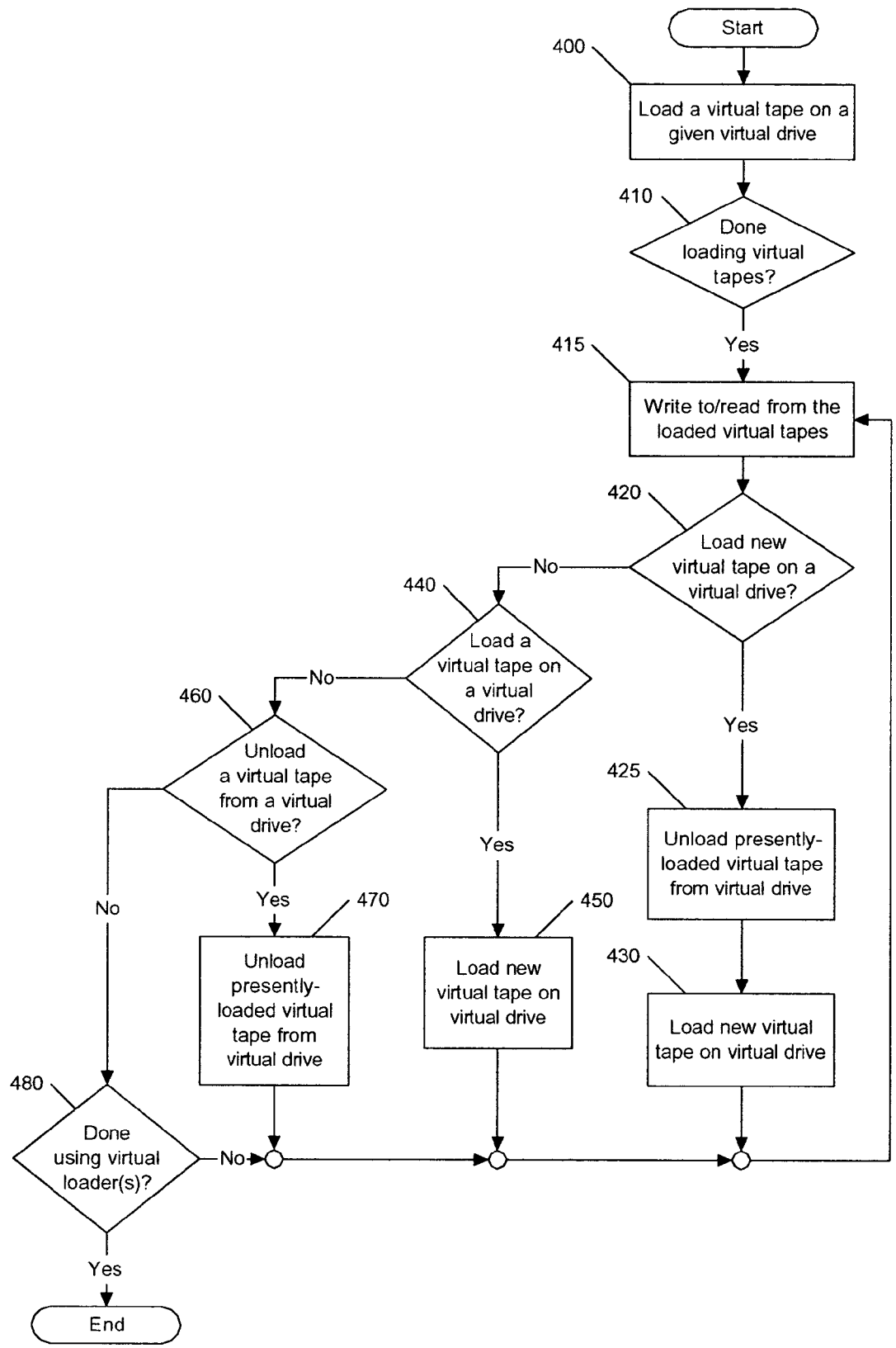
FIG. 4 is a flow diagram illustrating a process of operating a virtual tape library according to embodiments of the present invention.

FIG. 4 is a flow diagram illustrating the actions performed in loading and using virtual tapes in accordance with the process noted in the flow diagram of FIG. 3. The process begins with the loading of the desired virtual tape on a selected virtual loader's selected virtual tape drive (step 400). The system continues to load virtual tapes onto the selected virtual loaders until the loading of tapes is completed, either because all the desired tapes have been loaded onto their respective virtual loaders, or all of the available virtual loader drives are occupied (step 410).

At this point, the virtual loader(s) can be used to write to and read from the virtual tape(s) loaded thereon (step 415). When an action is to be taken with regard to a virtual tape, a determination is made as to the operations that need to be performed. The command may be to load a new virtual tape onto one of a given virtual loader's tape drives (step 420), which will entail removing the presently-loaded virtual tape from the given virtual loader's tape drive (step 425). Once the virtual tape has been unloaded, a new virtual tape can then be loaded (step 430).

Alternatively, if a new virtual tape does not require loading onto a virtual loader's tape drive (i.e., the currently-loaded virtual tapes are the desired virtual tapes), a determination is made as to whether any of the virtual loaders' tape drives are empty, and whether a virtual tape can be loaded onto one of those drives (step 440). At that point, another virtual tape can be loaded into a selected drive, thereby taking the place of the virtual tape originally loaded in that drive (step 450). If the user simply wishes to unload a virtual tape from a drive, the user issues the requisite command, and the system recognizes the command as such (step 460). In this case, if a virtual tape is currently loaded in the given drive, that virtual tape is unloaded (step 470). The desired operations having been performed, the user makes an indication as to whether or not they are finished using the virtual loader(s) (step 480).

Users of a system emulating a tape library according to embodiments of the present invention thus enjoy a number of advantages provided by such a system. For example, such users are able to have "use" of a tape library (an expensive and cumbersome piece of equipment) on their desktops, without the need for access to such physical equipment.

As noted, the files containing the information recorded on the virtual tapes is immediately available for inspection and analysis. The software can be stopped at any point, allowing the user to dissect the resulting files, to achieve an insight into the operation of the modules that make up the virtual loader emulation, and, more importantly, into the operation of the application (e.g., application 260), as well as the utility (e.g., utility 250).

In application, such a system can provide better performance than would be possible using a physical tape library, with the added advantage of more robust recovery. Several times a day (much more often than would be feasible with a physical tape library), user information can be backed-up to one or more virtual tapes. Then, on a daily basis (e.g., at night), the information backed-up on the virtual loader's virtual tapes can be backed-up to a physical tape library. Thus, with more frequent backups, the restoration of information is simplified, because the time steps in between backups is smaller than it could otherwise be, using a physical tape library. Such a methodology is facilitated by a one-to-one correspondence between the characteristics of the virtual loader and those of the physical tape library, which is easily achieved as a result of the flexible configuration made possible through the use of a virtual loader.

Moreover, frequent backups are made more practical due to the reduced amount of time required. This is because the backup, tape swapping and associated operations all proceed with the speed of software and hard disk operations, a vast improvement over the physical limitations of a physical tape library. However, because the information backed-up to the virtual loader is ultimately backed-up to a physical tape library, the benefits of long-term storage and portability are addressed, as is the ability to physically secure the media.

It will be noted that various processes according to embodiments of the present invention are discussed herein (e.g., with reference to FIGS. 3 and 4). It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

These operations may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

The software modules described herein may be received by a computer system, for example, from computer readable media. The computer readable media may be permanently, removably or remotely coupled to the computer system. Such computer readable media can include, for example: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, and the like; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media can be used to store and/or transmit the software modules discussed herein.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the processes described herein can be executed by a module (e.g., a software module) or a portion of a module or a computer system user using, for example, a computer system such as that discussed below.

An Example Computing and Network Environment

Figure 5:
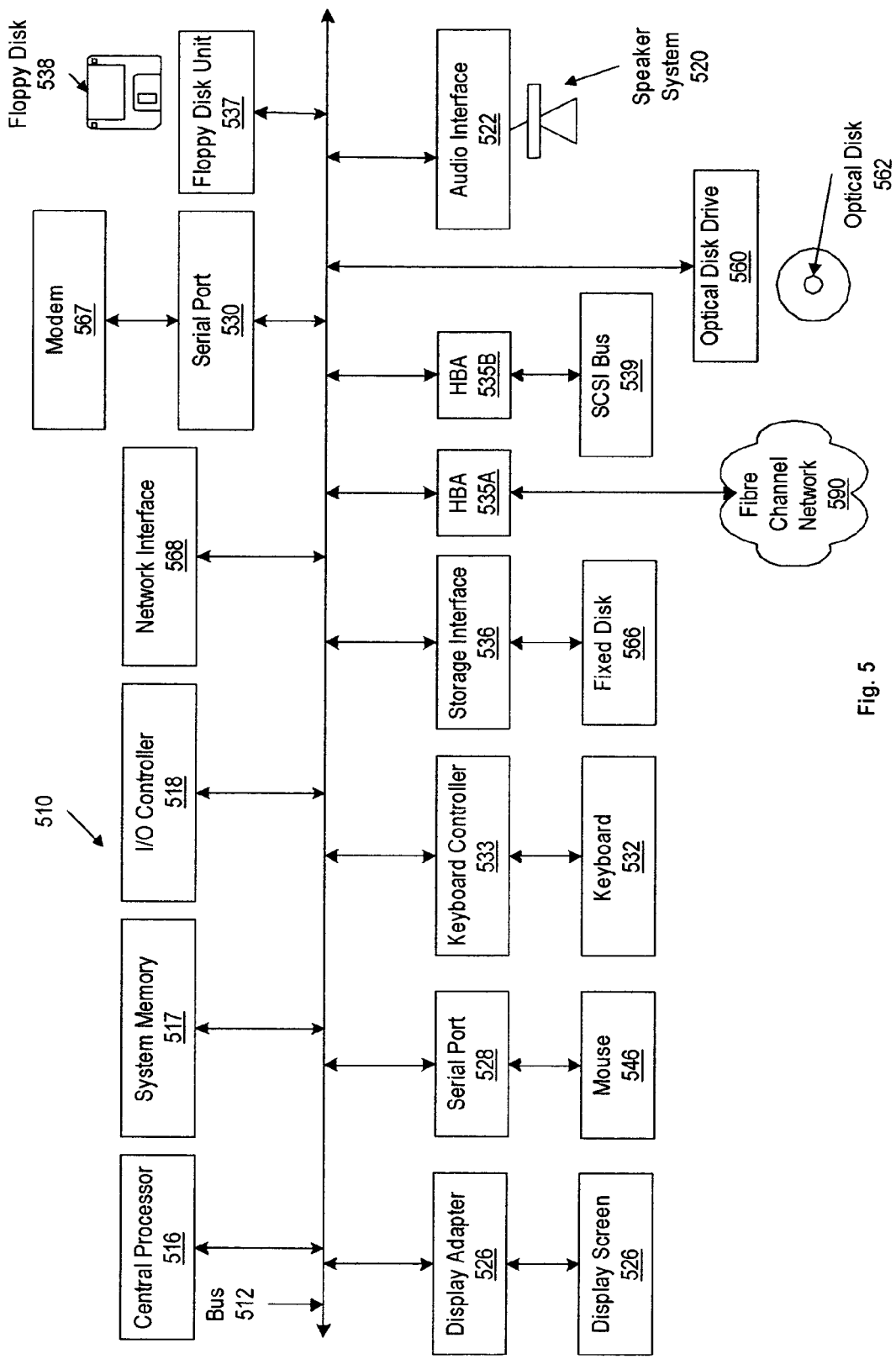
FIG. 5 is a block diagram illustrating an example computer system suitable for implementing the present invention.

FIG. 5 depicts a block diagram of a computer system 510 suitable for implementing a virtual loader according to the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., a fixed disk 544), an optical drive (e.g., optical drive 540), floppy disk unit 537 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as fixed disk drive 544. Fixed disk drive 544 may be a part of computer system 510 or may be separate and accessed through other interface systems. It will be apparent that a virtual loader of the present invention can be implemented, for example, using a hard disk drive such as fixed disk 544. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 517, fixed disk 544, optical disk 542, or floppy disk 538. Additionally, computer system 510 may be any kind of computing device, and so includes personal data assistants (PDAs), network appliance, X-window terminal or other such computing devices. The operating system provided on computer system 510 may be MS-DOS®, MS-WINDOWS®, OS/2®, UNIX®, Linux®, or another known operating system. Computer system 510 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 510). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 6:
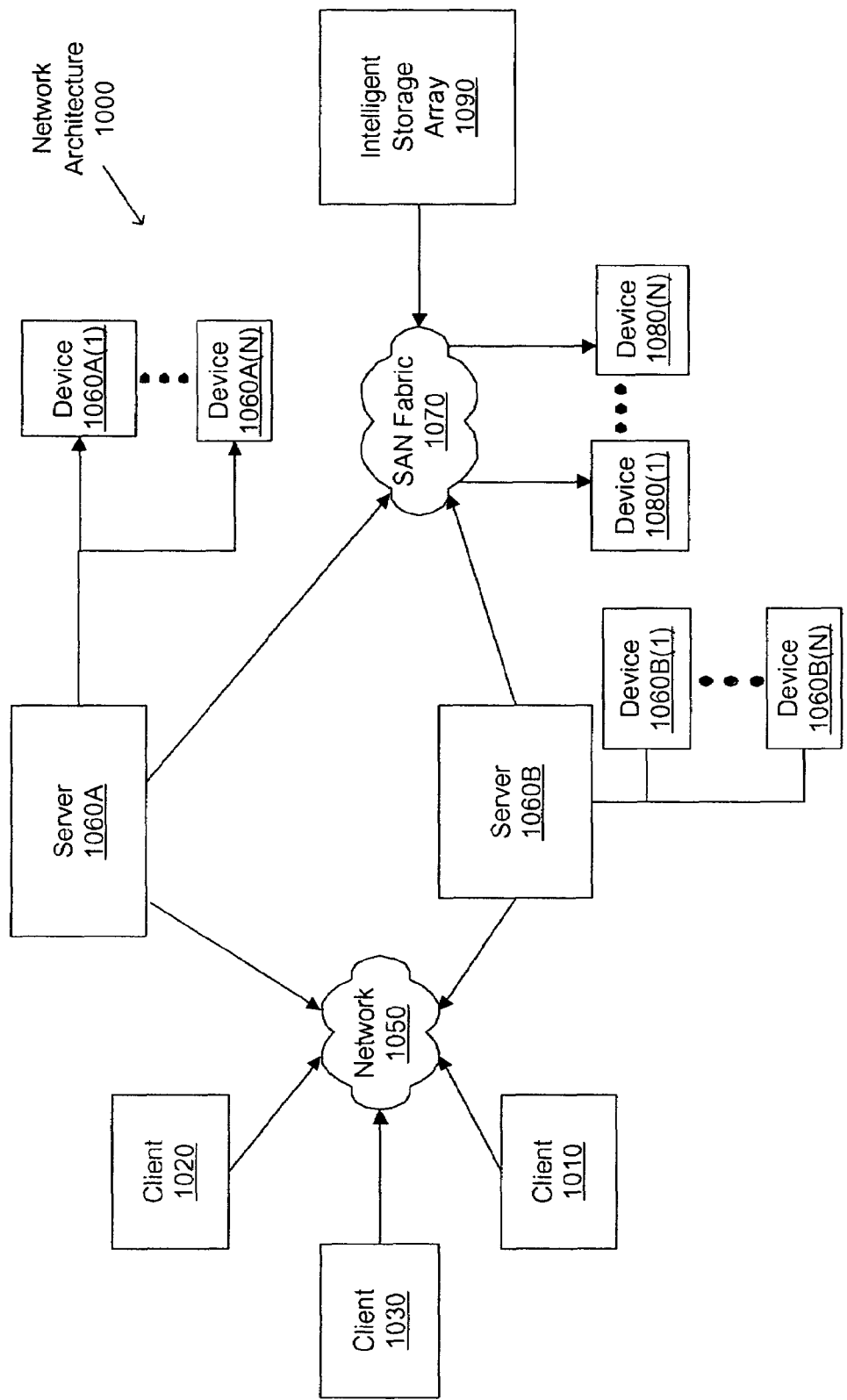
FIG. 6 is a block diagram illustrating a network architecture suitable for implementing the present invention.

FIG. 6 is a block diagram depicting a network architecture 600 in which client systems 610, 620 and 630, as well as storage servers 640A and 640B (any of which can be implemented using a computer system such as computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670. As will be apparent, a virtual loader of the present invention can also be implemented, for example, using one or more storage devices such as storage devices 660A(1)-(N), storage devices 660B(1)-(N) or storage devices 680(1)-(N) (via SAN fabric 670).

It will be noted that the variable identifier "N" is used in several instances in FIG. 6 to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

While particular embodiments of the present invention have been shown and described, it will be apparent to those skilled in the art that, based upon the teachings herein, changes and modifications may be made without departing from this invention and its broader aspects and, therefore, the appended claims are to encompass within their scope all such changes and modifications as are within the true scope of this invention. Moreover, while the invention has been particularly shown and described with reference to these specific embodiments, it will be understood by those skilled in the art that the foregoing and other changes in the form and details may be made therein without departing from the scope of the invention.

What is claimed is:

1. A system comprising:
 a computer readable storage medium comprising program instructions executable to implement a virtual tape interface, wherein
  said virtual tape interface is configured to allow a primary storage device to be accessed using at least one operation that is substantially the same as that used to control a tape backup device, wherein said primary storage device is accessed using said at least one operation in response to a call received from a utility by said virtual device interface,
  said virtual tape interface is coupled to control said primary storage device and said tape backup device,
  said virtual tape interface comprises a virtual loader library,
  said virtual loader library is configured to create a directory corresponding to a virtual loader on said primary storage device,
  said virtual loader library is configured to create a file, within said directory, corresponding to a virtual tape that can be loaded within said virtual loader,
  said virtual tape interface is configured to store data written to said virtual tape in said file,
  said primary storage device comprises non-removable storage media and is configured to provide access to data stored on said non-removable storage media, and
  said tape backup device comprises removable storage media and is configured to permit access to data stored on said removable storage media.

2. The system of claim 1, wherein
 said virtual tape interface is further configured to allow said utility to access said primary storage device as said tape backup device.

3. The system of claim 1, further comprising
 said primary storage device.

4. The system of claim 3, further comprising:
 said tape backup device.

5. The system of claim 3, wherein said virtual tape interface comprises:
 a virtual loader utilities module, communicatively coupled to said virtual loader library.

6. The system of claim 5, wherein said virtual tape interface further comprises:
 a main module, communicatively coupled to said virtual loader library; and
 a configuration file, accessible by said main module, wherein said configuration file comprises information that allows said virtual loader library to create said virtual loader on said primary storage device.

7. The system of claim 5, wherein
 said virtual loader library is configured to allow said utility to access said primary storage device as said tape backup device.

8. The system of claim 1, wherein said primary storage device comprises a plurality of files, wherein each of said files corresponds to a respective one of a plurality of virtual tapes.

9. A method comprising:
 creating a directory corresponding to a virtual loader on a primary storage device;

creating a file, within said directory, corresponding to a virtual tape that can be loaded within said virtual loader;

receiving a first command at a virtual tape interface, wherein said first command is received from a utility;

converting said first command to a second command using said virtual tape interface, wherein said first command is configured to control a first type of storage device, said second command is configured to control a second type of storage device, a tape backup device is said first type of storage device, said primary storage device is said second type of storage device, said primary storage device comprises non-removable storage media and is configured to provide access to data stored on said non-removable storage media, and said tape backup device comprises removable storage media and is configured to permit access to data stored on said removable storage media;

storing data written to said virtual tape in said file; and accessing said tape backup device using said virtual tape interface.

10. The method of claim 9, wherein
said primary storage device is a hard drive.

11. The method of claim 9, wherein said tape backup device is communicatively coupled to said virtual tape interface.

12. The method of claim 9, wherein said primary storage device comprises a plurality of files, wherein each of said files corresponds to a respective one of a plurality of virtual tapes.

13. A computer system comprising:
a processor;
computer readable medium coupled to said processor; and
computer code, encoded in said computer readable medium, configured to cause said processor to:
create a directory corresponding to a virtual loader on a primary storage device;
create a file, within said directory, corresponding to a virtual tape that can be loaded within said virtual loader;
receive a first command at a virtual tape interface, wherein said first command is received from a utility;
convert said first command to a second command using said virtual tape interface, wherein
said first command is configured to control a first type of storage device,
said second command is configured to control a second type of storage device,
a tape backup device is said first type of storage device,
said primary storage device is said second type of storage device,
said primary storage device comprises non-removable storage media and is configured to provide access to data stored on said non-removable storage media, and
said tape backup device comprises removable storage media and is configured to permit access to data stored on said removable storage media;
store data written to the virtual tape in said file; and
access said tape backup device using said virtual tape interface.

14. The computer system of claim 13, wherein
said primary storage device is a hard drive.

15. The computer system of claim 13, wherein said secondary storage device is communicatively coupled to said virtual tape interface.

16. The computer system of claim 13, wherein said primary storage device comprises a plurality of files, wherein each of said files corresponds to a respective one of a plurality of virtual tapes.

17. A computer program product comprising:
a first set of instructions, executable on a computer system, configured to convert a first command to a second command, wherein
said first command is received by a virtual tape interface from a utility,
said first command is configured to control a first type of storage device,
said second command is configured to control a second type of storage device,
a tape backup device is said first type of storage device,
said primary storage device is said second type of storage device,
said primary storage device comprises non-removable storage media and is configured to provide access to data stored on said non-removable storage media,
said tape backup device comprises removable storage media and is configured to permit access to data stored on said removable storage media, and
said virtual tape interface comprises said first set of instructions and is coupled to control said primary storage device and said tape backup device;
said virtual tape interface comprises a virtual loader library,
said virtual loader library is configured to create a directory corresponding to a virtual loader on said primary storage device,
said virtual loader library is configured to create a file, within said directory, corresponding to a virtual tape that can be loaded within said virtual loader,
said virtual tape interface is configured to store data written to said virtual tape in the file,
a second set of instructions, executable on said computer system, configured to access said tape backup device using said virtual tape interface; and
computer readable media, wherein said computer program product is encoded in said computer readable media.

18. The computer program product of claim 17, wherein said primary storage device is a hard drive.

19. The computer program product of claim 17, wherein said primary storage device comprises a plurality of files, wherein each of said files corresponds to a respective one of a plurality of virtual tapes.

20. An apparatus comprising:
means for creating a directory corresponding to a virtual loader on a primary storage device;
means for creating a file, within the directory, corresponding to a virtual tape that can be loaded within said virtual loader;
means for converting a first command to a second command, wherein
said first command is received by a virtual tape interface from a utility,
said first command is configured to control a first type of storage device,
said second command is configured to control a second type of storage device,
a tape backup device is said first type of storage device,
said primary storage device is said second type of storage device,
said primary storage device comprises non-removable storage media and a means to provide access to data stored on said non-removable storage media, said tape backup device comprises removable storage media and a means to permit access to data stored on said removable storage media, said virtual device interface stores data written to said virtual tape in said file; and said virtual device interface comprises said means for converting; and means for accessing said tape backup device using said virtual tape interface.

21. The apparatus of claim 20, wherein said primary storage device is a hard drive.

22. The apparatus of claim 20, wherein said secondary storage device is communicatively coupled to said virtual device interface.

23. The system of claim 20, wherein said primary storage device comprises a plurality of files, wherein each of said files corresponds to a respective one of a plurality of virtual tapes.

* * * * *